March 28, 1967

W. WITT ET AL 3,311,014

REFRACTOMETER FOR INDICATING THE INDEX OF
REFRACTION OF A FLUID STREAM

Filed Sept. 8, 1961

INVENTOR.
WALTER WITT
THOMAS H. LOTZE
BY

Arthur H. Swenson

ATTORNEY.

INVENTOR.
WALTER WITT
THOMAS H. LOTZE
BY Arthur H. Swanson
ATTORNEY.

United States Patent Office 3,311,014
Patented Mar. 28, 1967

3,311,014
REFRACTOMETER FOR INDICATING THE INDEX OF REFRACTION OF A FLUID STREAM
Walter Witt, Philadelphia, and Thomas H. Lotze, Warminster, Pa., assignors to Honeywell Inc., a corporation of Delaware
Filed Sept. 8, 1961, Ser. No. 136,938
8 Claims. (Cl. 88—14)

A general object of the present invention is to provide a measuring apparatus that is useful in measuring the index of refraction of a fluid.

It is another object of the invention to provide an improved measuring apparatus of the aforementioned type having an immersion type light transmitting probe unit which is useful in producing an electrical signal proportional to density, specific gravity, degree Brix or other characteristic of a fluid under measurement which varies in accordance with changes in the index of refraction of this fluid.

More specifically it is an object of the invention to provide a unitary light-to-electrical voltage signal transforming apparatus for selectively adjusting the entry angle at which the central longitudinal axis of the light cone enters an edge portion of one end of a light transmitting fluid immersed probe so that only one probe need be used to measure many different index of refraction ranges of fluids.

It is one of the principal objects of the present invention to provide a light sensor for the aforementioned probe at a position adjacent the light entry end of the probe to sense substantially all of the light that is refracted through this end and to thereby afford a more linear measurement of the index of refraction of the fluid than has been possible with prior index of refraction measuring devices.

In the drawing:

FIG. 1 of the drawing is a sectional view showing the aforementioned immersion type light transmitting probe unit mounted in a flow conduit;

Figure 1:
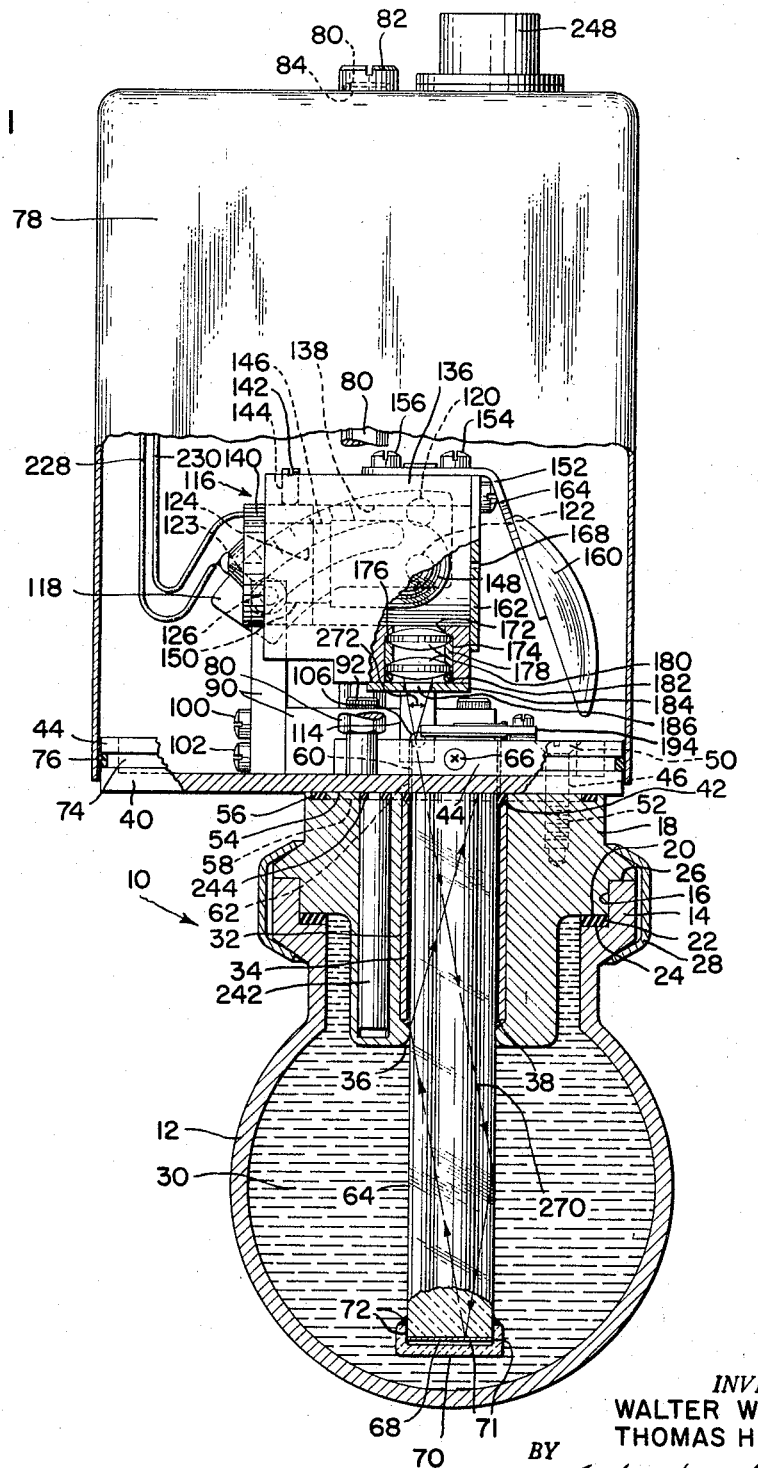

As viewed from the side of FIGS. 1–4 the aforementioned referred to light probe unit is readily identified as reference numeral 10. A section of a flow conduit 12 is also shown in FIG. 1 having an embossed sleeve portion 14 along a cylindrical surface 16 on which a cylindrical portion of a ferrule 18 is slidably engaged. A flat cylindrical bottom surface 20 of the ferrule 18 is shown in surface-to-surface contact with the gasket 22 and the lower surface of the gasket 22 is shown contacting a flat cylindrical surface 24 at the right end of the sleeve portion 14.

Another flat cylindrical portion of the ferrule 18 and the sleeve portion 14 are shown in surface-to-surface contact at 26. A stainless steel snap-acting spring toggle actuated clamping member 28 which may be of a commercially available type, for example, a quick release clamp commonly referred to and sold under the trade name of Tri-Clamp can be used to maintain the ferrule 18 and sleeve portion 14 in tight engagement along their contacting surface 26 when placed in the clamped position shown in FIG. 1. When the ferrule 18 and sleeve portion 14 are clamped together in this manner the gasket 22 will be depressed to a degree that will seal the space between the ferrule 18 and the sleeve portion 14 and thus prevent the fluid 30 passing through the flow conduit 12 from seeping through this joint.

It should be understood that the aforementioned snap-acting spring actuated clamping member 28 is provided with a toggle mechanism, not shown, which when manually actuated to a disconnect position provides a means to rapidly disconnect the removable ferrule 18 from the stationary sleeve position 14.

A central wall portion 32 of the ferrule 18 forms a cylindrical aperture therein. The outside wall surface of a compression sleeve 34 is shown in tight engagement with the wall portion 32 of the ferrule 18. Compressed between the right end of the sleeve 34 and a lip 36, formed on the right inner end of the ferrule 18, there is shown a first O-ring 38.

Figure 2:
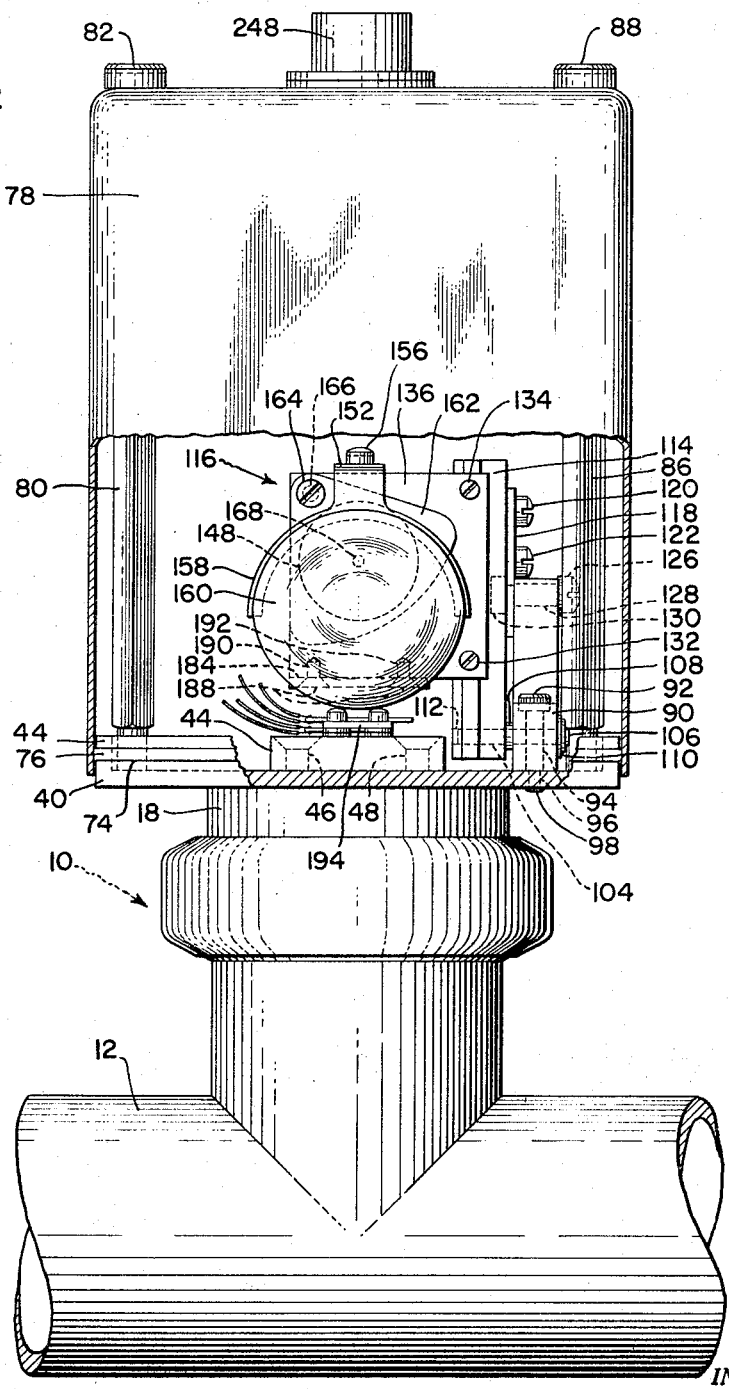
FIG. 2 is a right side view of the light transmitting probe unit shown in FIG. 1.

Between the left end of the sleeve 34 and a rectangular-shape mounted on the upper surface of the base plate 42. FIGS. 1 and 2 also show a plate 44 of a rectangular-shape mounted on the upper surface of the base plate 40. This plate is provided with a suitable number of countersunk holes such as is shown at 46, 48 through which screws such as the screw 50 can pass. The lower end of each of these screws is threadedly mounted in a tapped hole in the ferrule 18 in the manner as shown at 52 for the screw 50. When screw 50 and the other screws are tightened the upper surface of the ferrule 18 and the lower surface of the base plate 40 will be brought into contact with one another along contacting surface 54 as shown in FIG. 1. When this occurs an O-ring 56 that is shown inserted in a circular grooved-out portion 58 in the upper surface of the ferrule 18 will be forced into a compressed position as shown in FIG. 1.

The inner diametral wall portion 60 of the plate 44, the inner diametral wall portion 62 of the base plate 40, the inner diametral wall surface of the sleeve 34 and the inner diametral wall surface of the lip 34 of the ferrule 18 are each spaced at a distance from the transparent light transmitting probe 64 which will prevent them from contacting the probe.

The probe 64 is contacted and retained in a supported position solely by means of the O-ring seals 38, 42 and the threaded end of an adjustable screw 66. This probe may be made of a transparent material. This material may be a glass which is known in the glass fiield under the trade name of Noner. The upper end of the transparent light transmitting probe 64 is shown flush with the upper surface of the plate 44 and the lower end of this probe 64 is shown having a reflecting mirror surface 68 thereon and an opaque cap 70 spaced from the outer surface of the probe 64 whose enclosed end is filled with a silicone grease 71. The open end of this cap 70 is shown connected to a lower outer surface of the transparent probe 64 by pouring silica filled epoxy resin in a liquid state 72 on top of the grease 71 which resin is of the same temperature coefficient as the probe 64. This grease filled cap arrangement permits a fluid tight joint to be made between the probe 64 and the cap 70 when the resin 72 is cooled and solidifies without any damage being incurred in the light reflecting surface of the mirror or the light transmitting characteristics of the probe 64.

Except for the aforementioned material of which the probe is made and the way of connecting the cap to the probe the aforementioned probe 64 per se which includes the light reflecting surface 68 and the cap 70 can be the same general type as the transparent light reflecting probe disclosed in the Walter Witt et al. patent application Ser. No. 9,260, filed Feb. 17, 1960, now Patent No. 3,163,767, which is assigned to the same assignee as that to which the present application is assigned. While the various figures of the drawing disclosed the light probe unit 10 mounted on a wall of the conduit it should be understood that in some applications it may be preferred to mount the probe unit 10 in the portion of the conduit 12 to which it is connected at a position that is rotated ninety or one hundred and eighty degrees in either direction from the position shown in FIGS. 1 and 2 of the drawing.

In FIG. 1 a groove 74 is shown in the outer peripheral surface of the base plate 44 to accommodate an O-ring 76 that is inserted therein. The right end wall of the rectangular-shaped casing 78 is in compressed, air-tight, sealing engagement with the O-ring 76. The casing 78 is maintained in this air-tight relation by means of a screw member 80 fixedly connected by welding at one end to the base plate 44 and threadedly engaged with a cover screw 82 at its other end. When the cover screw 82 is tightened an O-ring 84, in a bottom grooved-out portion of this cover screw, will be in gas-tight engagement with the upper surface of the case 78. FIG. 2 shows the already described screw member 80 and cover screw fitting 82, together with a second of these screw members 86 and fitting 88 which is identical to the former mentioned screw member and cover screw fitting.

FIG. 2 of the drawing also shows a rigid L-shaped block 90. This block 90 is fixedly mounted within the casing 78 to base plate 44 by means of a pin 92 which passes through apertures 94, 96 in the block 90 and base plate 40. The right end 98 of the pin 92 is shown peened over against the right end of the base plate 40.

FIG. 1 shows how a horizontal portion of the L-shaped block 90 can be joined to the vertical portion of the block 90 by a suitable connecting means such as the screws 100, 102.

FIG. 2 shows an aperture formed by an inner wall surface 104 of the L-shaped block 90 so that a pivot pin 106 can be passed therethrough. The pin 106 has a shoulder 108 and a cotter pin 110 located on opposite sides of the L-shaed block 90 as shown, to prevent it from moving horizontally in either direction and to make it readily removable.

The outer end of the pivot pin 106 passes through an aperture wall portion 112 formed in a pivot plate 114 of an optical bench assembly unit 116. This pivot pin connection thus provides a means about which the plate 114 can be angularly displaced.

An index of refraction range adjusting indicating scale in the form of an arcuate-shaped plate 118 is shown fixedly connected to the pivot plate 114 by means of the screw connections 120, 122. This scale contains inscribed indicating scale marks 123 thereon for indicating angular displacements of the block 114. A wall portion 124 of the arcuate-shaped indicating scale plate 118 forms an aperture therein which protrudes downwardly away from the pivot plate 114. An adjustable cap screw retaining means 126 as shown protruding through an aperture formed by the wall surface 128 of the stationary L-shaped block 90 and extending through the aforementioned aperture wall portion 124 of the indicating scale plate 118. The other end of the cap screw retaining means 126 contains a nut 130 in threaded engagement therewith.

It can thus be seen from the aforementioned description that a structural arrangement of parts have been provided for rotating the pivot plate 114, and any other portions of the optical bench which are fixedly connected therewith, in an arcuate fashion through a selected angular indicating scale 123 position about the pivot pin 106 and further provides a screw and nut connection 126 to lock it in the aforementioned selected angular position on the scale 123 when the indicating pointer corner 127 of the block 90 is aligned therewith.

Fixedly connected to the central and left end of the pivot plate 114 by means of the screw connection 132, 134 there is shown, in FIG. 2 of the drawing, a hollowed-out block shaped member 136 which forms another portion of the rotatably positioned optical bench unit 116.

FIG. 1 of the drawing shows an aperture formed by an inner wall surface 138 of the member 136 which passes between and through two sides of the block member 136. A removable metal sleeve 140 is shown positioned within one end portion of the wall surface 138. This sleeve 140 is retained in a fixed position in the block 136 as shown by a set screw 142 threadedly mounted in a tapped hole 144 formed in the block 136.

The cylindrical base portion 146 of an electric light bulb 148 is soldered to an inner wall surface 150 of the sleeve 140. The sleeve 140 and bulb 148 contained therein can thus be readily repositioned or removed from the block 136 after the set screw 142 is loosened. This arrangement thus permits the light emitting filament of the bulb to be rotatably or longitudinally adjusted on the wall surface 138 as well as providing a means by which a burnt-out bulb 148 can be readily replaced with a new bulb.

The left end of the member 136 is shown having a bracket 152 retained thereon by means of the tapped screw connections 154, 156. As best seen in FIG. 2 the other end portion 158 of this bracket 152 is of a semicircular ring construction and is cemented by a suitable adhesive material to the peripheral portion of the concave mirror 160.

A light adjusting plate 162 is positioned between the light 148 and mirror 160. FIG. 2 shows how this plate 162 can be fixedly placed in one preselected angular position on a side of the block 136 by tightening a set screw 164 which is in threaded engagement with a tapped hole screw connection 166 in the block 136 when the plate is moved to the position shown in this figure. Loosening the set screw 164 will permit the light adjusting plate 162 to be rotated and fixed in other desired positions from the one shown in FIG. 2. Such an adjustment will allow the light emitted from the filament of the bulb 148 to be directed through an aperture 168 formed in this plate 162 and onto a different reflecting surface of the mirror 160 than that mirror surface on which the light was cast when the plate 132 is in the previously described FIG. 2 position. The manner in which a light ray 170 from the light source is transmitted in the aforementioned manner to the mirror 60 is thus shown for example in FIG. 3 of the drawing.

The wall surfaces 172, 174 of the block 136 are shown in FIG. 1 as forming two cylindrical openings of different diameter in the right end of the block 136. A chamfered peripheral wall portion 176 is shown extending between the wall surfaces 172 and 174. A spacer 178 separates a pair of identical double convex lenses identified in FIG. 1 of the drawing as reference numerals 180, 180. The left peripheral edge surface of one of these lenses 180 is held in fixed position between the chamfered wall portion 176 and a left chamfered edge of the spacer 178. The other lens 180 is held in a fixed position between a right chamfered edge of spacer 178 and a clip spring 182.

An aperture plate 184 having a wall surface 186 which forms an aperture therein is retained in fixed position by the threaded screws 188, 188 which are shown in FIG. 2 as being in threaded engagement with the associated tapped holes 190, 192.

Figure 3:
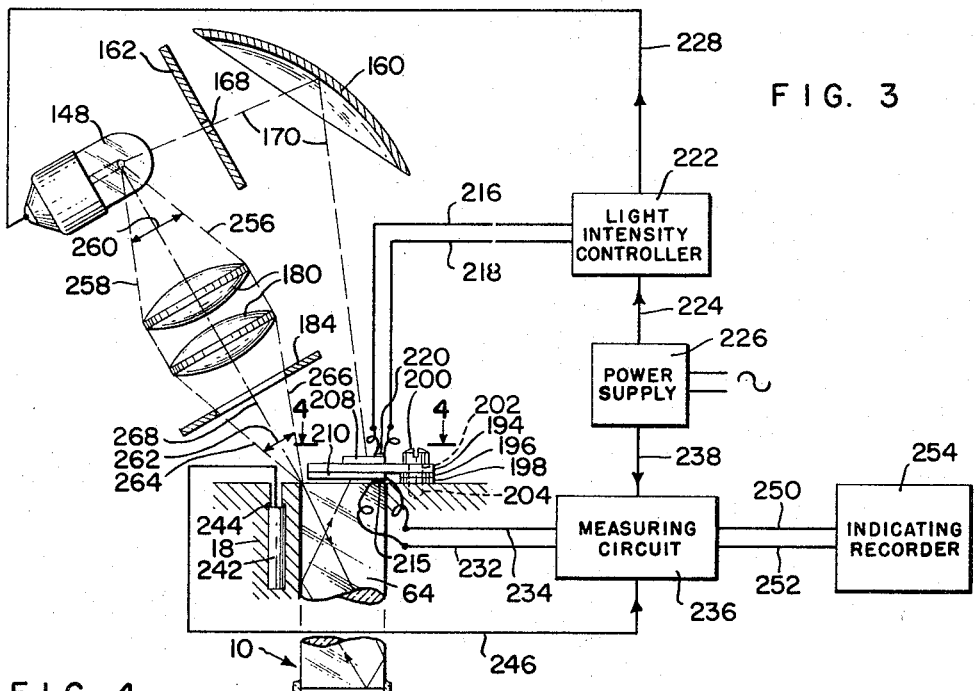
FIG. 3 is a view showing, in block diagram form, measuring, indicating and recording circuits for the light transmitting probe unit shown in FIGS. 1 and 2.
Figure 4:
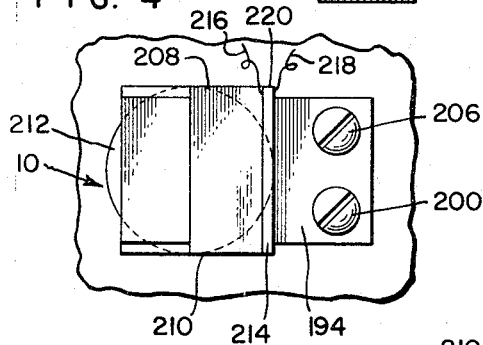
FIG. 4 shows a top plan view of the light reference and light transmitting cell portions of the light transmitting probe taken along section line 4—4 of FIG. 3.

As can best be seen in FIGS. 3 and 4 there is adjacent one end of the probe 64 a metal plate 194. Between the right side surface of this plate 194 and the plate 44 there is a pair of asbestos washers 196, 198. A nylon screw 200 passes through an aperture 202 in the plate 144 and a central open portion of the washers 196, 198 in order to connect the plate 194 in insulated, spaced-apart relationship with the plate 44 when this screw 200 is brought into threaded engagement with the threads formed by the tapped surface 204 in the plate 44.

FIG. 4 shows a plan view of the location of the screw connection 200 as well as showing schematically the location of another insulated screw connection-washer assembly 206 which is identical to the screw connection 200 and washer assembly already described. The construction of the plate 194 enables this plate to act as a heat sink for a reference light sensing cell which is shown as a solar cell 208 and a measuring light sensing cell which is shown as the solar cell 210 that are cemented to opposite sides of the plate 194 by means of a suitable electrical insulating silicone cement.

With the aforementioned heat sink 194 and light sensing cell arrangement, the measuring cell 210 will, when assembled, be spaced immediately above the left end of the probe 64 and located at a position which will cover all but the flat edge exposed surface 212 of the end of the probe 64. Furthermore the left end surface of the reference cell 208 as viewed in FIG. 3 contains a narrow thin rectangular tin strip 214 soldered thereto which strip 214 is best shown in FIG. 4 of the drawing. The right end surface of the measuring cell 210 as viewed in FIG. 3 also has a thin rectangular tin strip 215 soldered thereto which is identical to the strip 214 and which is positioned at the location that is immediately below the strip 214 shown in FIG. 4.

Electrical conductors 216, 218 are shown connected to the elongated end portions 220 of the tin strip 214 and the associated elongated end portion of light sensing reference cell 208 beneath this strip that is out of contact with the heat sink 194. These leads are connected to a light intensity controller 222. This controller may be of a type such as that disclosed in the Stanton Patent 2,481,485. The electrical conductor 224 is shown connecting the controller 222 to a suitable power supply 226.

Another electrical conductor 228 is shown in FIG. 3 connecting the light intensity controller to the electric light bulb 148 and FIG. 1 shows an additional wire 230 acting as a ground connection for the bulb 148.

Electrical conductors 232, 234 as shown connected to the elongated end portion of the tin strip 215 and the associated elongated end portion of the light sensing measuring cell 210 that is out of contact with the heat sink 194 and which end portions are immediately below the end portion of the strip 214 shown in FIG. 4.

The other end of the electrical conductors 232, 234 are connected to an electrical measuring circuit 236. This measuring circuit 236 is in turn suppled by way of an electrical conductor 238 with electric power from the power supply unit 226.

Figure 5:
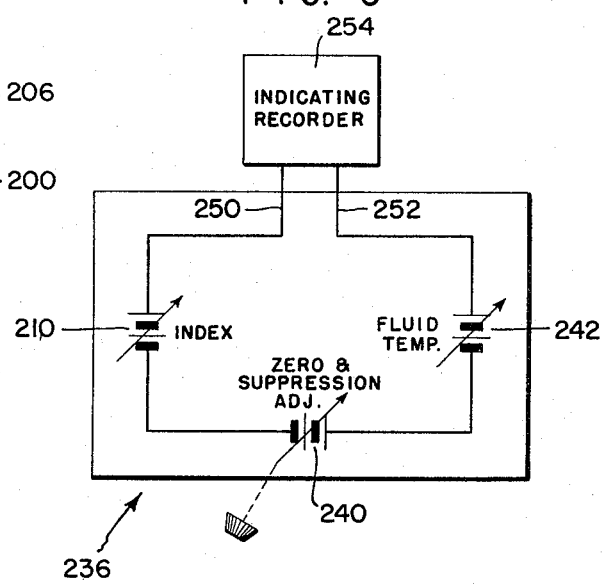
FIG. 5 is an electrical diagram of the measuring circuit shown in FIG. 3.

As can be seen in FIG. 5, the measuring circuit 236 contains a manually adjusted electric signal adjusting means 240 to provide a zero and suppression adjustment for the measuring circuit. The measuring circuit is also shown in FIG. 5 as having a means 242 for automatically adjusting the magnitude of the signal generated by this circuit in accordance with changes in the temperature of the fluid 30 in the conduit 12. This temperature compensating means is the resistance thermometer 242 that is inserted in a hollowed-out wall portion of the ferrule 18 which portion is shown in contact with the fluid 30 in FIGS. 1 and 3.

The left end of this resistance thermometer is notched and is provided with an O-ring 244. The resistance thermometer 242 shown in FIG. 3 is also provided with an electrical conductor 246 which connects it with the measuring circuit 236 of which it forms an integral part thereof.

The temperature compensation portion 242 of the measuring circuit can be adjusted to provide a plus or minus one percent of span compensation for a plus or minus ten degrees Fahrenheit variation from a normal operating temperature of the fluid 30. Although it should be understood that no fixed limits should be ascribed to the operating temperature over which this temperature compensation circuit can be applied, it has been shown, by way of example, that satisfactory temperature compensation can be effected where operating temperatures are between sixty-five degrees Fahrenheit and two hundred degrees Fahrenheit.

The controlled 222 and measuring circuit unit 236 can be located in the left hollowed-out portion of the casing 78 so that each of them can be connected to the power supply 226 by way of the electrical conductors 224, 238 as shown in FIG. 3.

FIG. 1 schematically shows a suitably sealed air-tight opening 248 in an end of the casing 78 through which these electrical connections 224, 238 can pass.

The means which is employed to automatically change the magnitude of the output signal of the measuring circuit which is transmitted by way of the conductors 250, 252 through an indicating recorder 254 is the light sensing measuring cell 210 previously described and its leads 232, 234 which form an integral part of this measuring circuit.

The indicating recorder 254 may be of any one of a number of commercially available recorders. This recorder may for example be of a type such as that disclosed in the Wills Patent 2,423,540, issued July 8, 1947, which will indicate the value of the index of refraction of the fluid under measurement directly in terms of the density of the fluid or any other characteristic of the fluid that is related to this index of refraction measurement.

As an alternative the index of refraction indicating recorder 254 may be of the type disclosed in the Popowsky Patent 2,847,625 which will convert the millivolt signal being received from the measuring circuit unit 236 into an electrical current signal whose magnitude is proportional to this millivolt signal.

Still another alternative of the index of refraction indicating recorder 254 can be of the type disclosed in the Zimmerli Patent 2,915,695 which will convert the millivolt signal being received from the measuring circuit unit 236 into a pressure signal whose magnitude is proportional to this millivolt signal.

In either of the aforementioned cases the indicating recorder 254 selected will be capable of continuously indicating changes in the index of refraction of the fluid 30 in terms of the magnitude of the electric signal it receives from the measuring circuit unit 236.

The range of index of refraction values which the aforementioned described apparatus can measure extends between 1.333 and 1.487. The apparatus described herein can therefore be readily employed to measure the index of refraction of fluids and slurry mixtures such as various types of sugar solutions, alcohol puree, soups, acetic acid, hydrogenated fats, egg solids, tomato products, fruit butters, maple syrup, jellies, jams, fruit and berry preserves, fruit juices, condensed milk, carbonated beverages and any other fluid or slurry mixture which possesses an index of refraction which lies between the 1.333 and 1.487 index of refraction value previously referred to.

Furthermore it should be noted that each of these fluids when in a pure state possesses a known narrow or wide range of index of refraction which lies within 1.333 to 1.487 which the instrument described herein is capable of measuring. It should be noted that the index of refraction range of measurement which the measuring apparatus disclosed herein is capable of measuring has only been cited by way of example for solutions which lie within one preselected index of refraction measuring range. It should be understood that where it is desired to measure solutions whose range of index of refraction is above or below the nidex of refraction range 1.333 and 1.487 previously referred to that types of glass having indexes of refraction differing from the aforementioned trade name Noner type of glass previously referred to can be satisfactorily used for this purpose.

FIG. 3 shows two rays of light 256, 258 which form two outer rays of a cone of light 260, the base portion of which is emitted against lenses 180, 180. The emitted light from bulb 148 is transmitted by lenses 180, 180 and aperture plate 184 in the form of a second cone of light 262 formed by its outer rings 264, 266 against an outer flat edge surface 212 of the left end of the transparent probe 64.

The light entry angle for the optical bench 136, or angle at which the central longitudinal ray of the cone 268 makes with the left flat end of the probe, is selected to suit the aforementioned known index of refraction which is desired for the fluid under measurement. The entry angle of the optical bench can as previously mentioned be, for example, changed from the position shown in FIG. 1 wherein a lower outer ray of light 270, which forms a conical surface portion of the light cone 272, is shown hitting the side wall of the probe to an entry angle specifically shown in FIG. 3 by merely moving the optical bench downward about the pivot pin 106 and locking the bench in the position shown in this figure by tightening the nut 130 on the screw 126 which is mounted on the stationary L-shaped block member 90.

Refractive index of a fluid is $$\frac{\text{Velocity of light in a vacuum}}{\text{Velocity of light in the fluid}}$$

Snell's law dictates that the magnitude of the critical angle will be determined by the ratio of the refractive indices of the two mediums, in this case, the refractive index of the rod 64 and the index of the fluid 30. Therefore, any change in the refractive index of the fluid 30 will change the critical angle, which in turn will permit more or less light to pass between the rod 64 and the fluid 30.

In general as the density of the fluid increases the velocity of light will decrease thus increasing the refractive index of the fluid. Since the index of refraction will also depend upon the wave length of the light, prior index of refraction measuring devices have used a wave length of 5890 Angstrom units as a standard.

The index of refraction measuring apparatus disclosed herein does not indicate the refractive index of a fluid under measurement with reference to a specific wavelength. The index of refraction measuring apparatus disclosed herein measures the refractive index of a composite of wavelengths and is calibrated with the specific solution with which it will be used or equivalent, due to the dispersion of refractive index with different rod-fluid combinations.

It can thus be seen that as light rays from the incandescent light source 64 are collected and focused upon the edge 212 of the left end entry surface of the transparent probe 64 these light rays will initially spread out as they pass through the probe. These light rays will then strike the interface between the peripheral portions of the probe and the fluid at many different angles. Light rays which strike this interface at an angle less than the critical angle will have some component of its intensity transferred to the solution by refraction. Light rays striking this interface at an angle greater than the critical angle will be reflected back into the probe. Reflected light that remains in the probe when it reaches the immersed end of the probe will be reflected back in a manner similar to that previously described for the light entering the probe, to the measuring cell 210 by the mirror surface 68 at the end of the sensing probe 64.

The magnitude of the refractive index of the solution will determine the amount of light which will be refracted into the solution, the magnitude of the reflected light collected by the measuring cell 210 will thus be directly related to the refractive index of the fluid.

It should be noted that since practically the entire surface of the nonimmersed end of the probe is covered with the measuring cell 210 substantially all of the light refracted from this end portion of the probe will be sensed by the cell 210.

The aforementioned light entry angle is selected so that light rays emitted by light bulb 148 will be focused against various portions of the peripheral side wall of the probe 64 at the critical angle of incidence which is present between the fluid under measurement 30 and the probe 64 when the index of refraction of the fluid 30 coincides with the index of refraction that is desired for this fluid. When this condition is present no light will be refracted out of the side of the probe 64. All of the light rays entering the probe 64 under this condition will thus be either reflected against the peripheral side walls of the probe or be caused to travel in a reflected manner along longitudinal, peripheral surfaces of the rod. In either instance these light rays will not be refracted out of the rod 64. Under this condition the indicating recorder 254 will show the index of refraction of the fluid under measurement 30 exactly coinciding with the value of the preselected desired index of refraction selected for the fluid.

In a similar manner to that already described it can be seen that when the value of the index of refraction of the aforementioned fluid under measurement is lower than the preselected value of the index of refraction selected and desired for this fluid, then, substantially all of the light entering the probe 64 will be reflected against the side of the probe 64 without incurring any loss in light by refraction to the fluid 30 that is in contact therewith. Under these conditions the indicating recorder 254 will show the index of refraction of the fluid under measurement slightly lower than the value of the preselected index of refraction selected and desired for this fluid.

If another condition exists in which the value of the index of refraction of the aforementioned fluid under measurement is higher than the preselected value of the index of refraction selected and desired for this fluid then some of the light rays hitting the peripheral interface between the probe and the fluid under measurement will be refracted into the fluid. The refraction of some of these light rays will take place because under these conditions these rays of lights are caused to hit the interface formed between the peripheral portions of the probe 64 and the fluid at an angle which is less than the critical angle which exists because of the preselected relationship existing between the index of refraction of the fluid 30 and probe 64 when the light enters the light entry end of the probe at the preselected entry angle.

The reference light sensing cell 208 as shown in FIG. 3 is exposed to the rays of light such as the ray 170 emitted by the light bulb 148. As previously mentioned this reference cell is electrically connected to the power source 226 to maintain the power transmitted to the light source at a value which will maintain the intensity of light emitted by the bulb 148 at a constant value despite the lowering of the intensity of light effect that aging has on the filament and other parts of this light bulb. From the aforementioned description of the index of refraction measuring apparatus it can be seen that a unique angularly adjustable optical bench and light sensing measuring cell-probe structure has been disclosed herein.

This angularly displaced optical bench and light measuring cell-probe structure allows rays of light in the form of a light cone to enter only a small edge portion of a light entry end of an immersion probe in such a way that these rays will hit only a preselected critical angle of incidence when they come in contact with the interface surface that is established between peripheral portions of the probe and a fluid in contact therewith whose index is to be measured.

The optical bench 116 together with the aforementioned measuring cell which covers all but the light entry end portion of the probe thus provides a way of maintaining the intensity of light rays being refracted out of the entry end of the probe against the measuring cell substantially equal to the intensity of these light rays when they initially entered the probe under a condition in which the fluid under measurement is at a preselected desired index of refraction and the light entering the probe is hitting the interface established between the peripheral surfaces of the probe and the fluid at the critical angle that is established between these two substances.

What is claimed is:

1. A light to electrical energy transforming apparatus for continuously indicating changes occurring in the index of refraction of a fluid stream, comprising the combination of a solid transparent light transmitting rod, a light emitting optical means, a light sensing means and an index of refraction indicating means, said solid rod being comprised of an enclosed flat coated light reflecting end surface and an opposite flat light emitting end suface, the flat light reflecting end surface and a longitudinal portion of the rod extending therefrom being in physical contact with said fluid stream and the remaining portion of the solid rod being out of contact with the fluid stream, said light sensing means being positioned to cover all but a flat edge surface portion of the light emitting end surface of the rod, the optical means comprising a light source, lenses and an aperture operably positioned to focus the apex of a cone of light rays against said flat edge portion and thence into the rod against a peripheral side wall surface portion thereof that is in physical contact with said fluid stream at a preselected critical angle of incidence, the optical light cone producing means and light transmitting rod structure affording substantially no refraction of light from said rod to said fluid when the index of refraction of said fluid is at a value that is at or below a preselected value, said structure further affording a proportionate increase in loss in light refracted through the side wall of the rod to the fluid under a condition in which the index of refraction of the fluid is being increased beyond said preselected value said structure being operable to afford a proportionate decrease in the loss in the light refracted through the side wall of the rod under a condition in which the index of refraction of the fluid is being lowered from a value which exceeds said preselected index of refraction toward the preselected index of refraction value, and an electrical conductor means connecting the light sensing means in circuit with the fluid stream index of refraction indicating means to transmit a signal that is proportionate to the quantity of the light that is refracted out of said rod to said fluid.

2. A light to electrical signal transforming apparatus to produce continuously an electrical signal for transmission whose magnitude is proportional to changes occurring in the index of refraction of a fluid under measurement, comprising a light transmitting rod, a light emitting optical bench to direct the apex portion of a cone of light rays against an edge portion of a flat end surface of the rod that is out of contact with the fluid and thence at a preselected critical incident angle against a peripheral side wall surface of the rod that is in contact with the fluid, an inclosed reflecting coating covering an opposite flat end surface of the rod, a light responsive means comprising a light sensing surface displaced from and covering the flat end surface portion of the rod that is immediately adjacent the edge portion of the rod against which the cone of light rays is directed, said light responsive means being operably constructed to generate a continuous electrical signal that is proportional to the intensity of light leaving the last-mentioned end surface portion of the rod that is directed against the light sensing surface, a receiving means, and an electrical conductor between said light sensing surface and the receiving means to effect the transmission of an electrical signal to the receiving means whose magnitude changes in accordance with changes occurring in the magnitude of the index of refraction of the fluid under measurement.

3. The light to electrical signal transforming apparatus as defined in claim 2 wherein said optical bench is operably connected for angular displacement about a stationary pivot and a mechanical adjustably slidable clamping means is provided to alter the critical angle that the apex of said light cone makes with the peripheral side wall surface of the rod.

4. The light to electrical signal transforming apparatus as defined in claim 2 wherein the light emitting optical bench is provided with a concave light reflecting mirror and an aperture plate, said plate being positioned to simultaneously transmit other light rays sequentially by way of an aperture formed in the plate to the mirror, light responsive means having a light sensing surface, said second light sensing surface being separated from the first-mentioned light sensing surface by means of a plate forming a heat sink therebetween, electrical conductors operably connecting said second light sensing surface with a light intensity regulating controller, and said light intensity regulating controller being operable to transmit an electrical input signal to said light emitting optical bench whose magnitude varies with the intensity of the light received by said second light sensing surface to thereby continuously maintain the intensity of the light emitted by the optical bench at a constant value.

5. A light to electrical signal transforming apparatus to produce continuously an electrical signal for transmission whose magnitude is proportional to the index of refraction of a fluid under measurement, comprising a light transmitting rod, a light emitting optical means to focus the apex of a cone of light rays against an edge portion of a flat end surface of one end of the rod and thence against a peripheral side wall surface of the rod, an inclosed reflecting coating on the opposite end of the rod, and a light sensing means postiioned to receive light emitted from the remaining flat surface portion of the first-mentioned end surface of the rod to thereby generate an electrical signal proportional to the intensity of the light refracted therefrom.

6. The light to electrical signal transforming apparatus as defined by claim 2 wherein a temperature sensing means is operably positioned adjacent said light transmitting rod to sense the temperature of the fluid under measurement, an electrical circuit conductor to connect said temperature sensing means to the receiving means, and wherein said second electrical circuit is operably connected to said receiving means to negate any change in magnitude effect that a change in the temperature of the fluid has on the electrical signal being transmitted by said light sensing surface to said receiving means.

7. The light to electrical signal transforming apparatus as defined by claim 5 wherein a temperature sensing means is operably positioned adjacent said light transmitting rod to sense the temperature of the fluid under measurement, a first electrical measuring circuit connected to said light sensing means, a second electrical circuit connection between said temperature sensing means and the first-mentioned electrical circuit, and said second electrical circuit comprising means to negate any change in magnitude effect a change in the temperature of the fluid has on the electrical signal being transmitted by the light sensing means to said first mentioned electrical circuit.

8. A light to electrical signal transforming apparatus to produce a continuous electrical signal for transmission whose magnitude is proportional to the index of refraction of a fluid under measurement, comprising a light transmitting rod having flat opposite end surfaces, a light emitting optical means to direct the apex of a cone of light rays against an edge portion of one of the flat end surfaces of the rod and thence into the rod against a peripheral side wall surface of the rod that is in contact with the fluid, an inclosed reflecting coating covering the entire other flat end surface of the rod, and a light responsive means positioned to receive substantially all of the rays of light emitted by the optical means that passes through the light entry end of the rod and has thereafter been reflected from the side wall and the light reflecting coated end of the rod through the other remaining flat surface portion of the light entry end of the rod, and said light responsive means being operable to generate an electrical signal proportional to changes occurring in the index of refraction of the fluid.

References Cited by the Examiner

UNITED STATES PATENTS

| | | | |
|---|---|---|---|
| 2,550,818 | 5/1951 | Johnson. | |
| 2,727,997 | 12/1955 | Schofield | 88—14 X |
| 2,823,301 | 2/1958 | Stevens | 250—205 X |
| 2,945,187 | 7/1960 | McCollom | 88—14 X |
| 2,964,993 | 12/1960 | Witt | 88—14 |
| 3,163,767 | 12/1964 | Witt et al. | 88—1 |

DAVID H. RUBIN, *Primary Examiner.*

E. G. ANDERSON, JEWELL H. PEDERSEN,
*Examiners.*

T. L. HUDSON, C. E. QUARTON, *Assistant Examiners.*